(12) United States Patent
Gee et al.

(10) Patent No.: US 7,875,673 B2
(45) Date of Patent: Jan. 25, 2011

(54) EMULSIONS OF ORGANOPOLYSILOXANE RESINS PRODUCED BY EMULSION POLYMERIZATION

(75) Inventors: Ronald Paul Gee, Midland, MI (US); Yihan Liu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 104 days.

(21) Appl. No.: 11/579,073

(22) PCT Filed: Jun. 17, 2005

(86) PCT No.: PCT/US2005/021392

§ 371 (c)(1),
(2), (4) Date: Oct. 30, 2006

(87) PCT Pub. No.: WO2006/016968

PCT Pub. Date: Feb. 16, 2006

(65) Prior Publication Data

US 2008/0027172 A1 Jan. 31, 2008

Related U.S. Application Data

(60) Provisional application No. 60/585,932, filed on Jul. 7, 2004.

(51) Int. Cl.
*C08L 83/04* (2006.01)

(52) U.S. Cl. .......................... 524/588; 516/55

(58) Field of Classification Search ................. 524/588; 528/10, 12, 25, 29; 516/53, 55, 72, 76–77
See application file for complete search history.

(56) References Cited

U.S. PATENT DOCUMENTS

| | | | |
|---|---|---|---|
| 2,891,920 A | 6/1959 | Hyde et al. | |
| 3,294,725 A | 12/1966 | Findlay et al. | |
| 3,433,780 A * | 3/1969 | Cekada et al. | 524/156 |
| 4,424,297 A | 1/1984 | Bey | |
| 4,778,624 A | 10/1988 | Ohashi et al. | |
| 4,857,582 A | 8/1989 | Wolfgruber et al. | |
| 4,935,464 A * | 6/1990 | Ona et al. | 524/837 |
| 5,102,967 A | 4/1992 | Meder et al. | |
| 6,316,541 B1 | 11/2001 | Gee | |
| 2003/0040571 A1 | 2/2003 | Feng et al. | |
| 2003/0143176 A1* | 7/2003 | Liu et al. | 424/70.12 |

\* cited by examiner

*Primary Examiner*—Kuo-Liang Peng
(74) *Attorney, Agent, or Firm*—Alan Zombeck

(57) ABSTRACT

An aqueous siloxane resin containing emulsion is prepared by: (i) adding water, at least one nonionic surfactant, optionally adding an ionic surfactant, and a catalyst, to a reaction vessel, and heating the contents of the vessel to form a mixture; (ii) adding to the mixture at least one silane monomer of the formula $RSi(OR')_3$; (iii) optionally, adding to the mixture, silane monomers of the formula $R_2Si(OR')_2$ or $R_3SiOR'$; (iv) allowing the silane monomer to hydrolyze and condense by a polymerization reaction in the catalyzed aqueous mixture; (v) terminating the reaction by neutralizing the mixture; and (vi) recovering from the mixture a siloxane resin emulsion containing a siloxane resin.

3 Claims, No Drawings

EMULSIONS OF ORGANOPOLYSILOXANE RESINS PRODUCED BY EMULSION POLYMERIZATION

CROSS REFERENCE TO RELATED APPLICATIONS

This application is a U.S. national stage filing under 35 U.S.C. §371 of PCT Application No. PCT/US2005/021392 filed on 17 Jun. 2005, currently pending, which claims the benefit of U.S. Provisional Patent Application No. 60/585,932 filed 7 Jul. 2004 under 35 U.S.C. §119 (e). PCT Application No. PCT/US2005/021392 and U.S. Provisional Patent Application No. 60/585,932 are hereby incorporated by reference.

This invention is directed to emulsions containing organopolysiloxane resins that are prepared by emulsion polymerization. In particular, the invention is directed to emulsions containing organopolysiloxane resins that consist of all or a substantial amount of trifunctional T units, i.e., $RSiO_{3/2}$.

As used herein, the symbols M, D, T, and Q, represent the functionality of structural units that can be present in organosilicon compounds containing siloxane units joined by $\equiv$Si—O—Si$\equiv$ bonds. The monofunctional (M) unit represents $(R)_3SiO_{1/2}$; the difunctional (D) unit represents $(R)_2SiO_{2/2}$; the trifunctional (T) unit represents $RSiO_{3/2}$ and results in the formation of branched linear siloxanes; and the tetrafunctional (Q) unit represents $SiO_{4/2}$ which results in the formation of crosslinked and resinous compositions. Hence, T is used when the siloxane contains all trifunctional T units; and DT is used when the siloxane contains difunctional D units and trifunctional T units. R can be the same or a different monovalent hydrocarbon group having 1-18 carbon atoms, typically a group such as methyl.

Trifunctional siloxane T units combining with one another generally result in molecules that are crosslinked randomly in three dimensions. Difunctional siloxane D units and trifunctional siloxane T units combine in general to yield macromolecules that have the nature of networks when the content of T units is high. An excess of D units results in chains that are crosslinked or branched at long intervals. The monofunctional M unit endcaps siloxane molecules and terminates further chain growth in order to limit the molecular weight of the siloxane polymer.

Generally, aqueous emulsions of linear siloxanes, i.e., diorganopolysiloxanes with an average unit formula of $R_2SiO_{2/2}$ in which R is typically a monovalent hydrocarbon group having 1-18 carbon atoms, are known to be useful in a wide variety of applications. Some methods of preparing such emulsions by emulsion polymerization are also known in the art, such as the methods described in, for example, U.S. Pat. No. 2,891,920 (Jun. 23, 1959); U.S. Pat. No. 3,294,725 (Dec. 27, 1966); and U.S. Pat. No. 6,316,541 (Nov. 13, 2001), hereafter referred to as the '541 patent. The '541 patent in particular, describes a method of making an aqueous emulsion of diorganopolysiloxane with emphasis on particle size control.

Aqueous emulsions of organopolysiloxane containing all or a substantial amount of trifunctional units T units $RSiO_{3/2}$, thus rendering the organopolysiloxane resinous, can also be prepared by emulsion polymerization. Such mode of preparation allows a solvent-free synthesis, as well as a water delivery of a variety of siloxane resins, for applications in personal care, textiles, and coatings. This mode avoids the handling problems normally associated with solids or semi-solids and solvents, and eliminates the difficult problem of emulsifying a resinous material. Although several methods have been identified as being capable of preparing siloxane resin emulsions by emulsion polymerization, no satisfactory method has yet been found to produce stable resin emulsions with an absence of gelled particles, and enabling the provision of a wide range of targeted particle sizes.

Thus, U.S. Pat. No. 3,433,780 (Mar. 18, 1969) describes a silsesquioxane ($RSiO_{3/2}$) particle containing suspension with average particle size of 1-100 nanometer (0.001-0.1 micrometer μm) containing an anionic surfactant or a cationic surfactant. Nonionic surfactants can be used in amounts having no adverse effect on the stability of the product. The process involves the addition of a reactive silane to a water-surfactant mixture, accompanied by agitation under acidic or basic conditions to form the silsesquioxane suspension.

U.S. Pat. No. 4,424,297 (Jan. 3, 1984) describes a colloidal suspension of silsesquioxane ($RSiO_{3/2}$) particles having an average particle size of 1-100 nanometer (0.001-0.1 micrometer μm), made by adding trifunctional silanes to an aqueous mixture containing a long-chain carboxylic acid or a salt thereof at a basic pH. All of the examples, however, show the solid content to be less than 12 percent in the final product.

U.S. Pat. No. 4,778,624 (Oct. 18, 1988) describes methods of making silsesquioxane ($RSiO_{3/2}$) particle containing emulsions by first emulsifying trialkoxysilanes using a combination of a cationic surfactant and a nonionic surfactant. The nonionic surfactant must have an HLB value in the range of 16-20. The next step in the process involves adding an alkali catalyst to effect hydrolysis and condensation. Thus, this method requires a first step of mechanically emulsifying the silane starting material. It further specifies that the addition of the catalyst should necessarily follow emulsification of the starting material; and that when the starting material is emulsified in an aqueous medium containing the surfactants and the alkaline catalyst, no satisfactory results can be obtained.

The '624 patent contains a Comparative Example showing that feeding unemulsified silane monomers to aqueous surfactant solutions containing the alkaline catalyst, resulted in a large amount of gelled material. In addition, the method appears to be limited to the production of only fine particle size emulsions. The cited average particle size in all of the Examples in the '624 patent, is revealed to be approximately 70 nanometer (0.07 micrometer μm); and such emulsions are said to possess a pale bluish translucent appearance, typically expected for a 70 nanometer (0.07 micrometer μm) particle size. No white appearance is noted in any of the Examples, indicative of particles having an average particle size smaller than 100 nanometer (0.1 micrometer μm). In addition, (i) all of the Examples show a content of less than 12 percent of the resin in the products, and (ii) the resulting resin is described as a white powder that is insoluble in any organic solvent, indicating that the resin produced is likely a completely gelled network within each of the particles.

In U.S. Pat. No. 4,857,582 (Aug. 15, 1989), a continuous process is described for making colloidal suspensions of organopolysiloxanes containing at least two different units among monofunctional M units, difunctional D units, trifunctional T units, and tetrafunctional Q units. The organopolysiloxanes are exemplified by DT and MQ type structures. The process involves a very slow feeding of alkoxysilanes and polysiloxanes into a reaction medium, and continuously removing alcohols formed from hydrolysis of the alkoxysilanes from the emerging suspension. The resulting suspensions have an average particle size of 10-150 nanometer (0.01-0.15 micrometer μm). The surfactants used in the process are either anionic surfactants or cationic surfactants.

The process described in U.S. Pat. No. 4,935,464 (Jun. 19, 1990) relates to the preparation of microemulsions consisting primarily of difunctional D units and trifunctional T units to form DT type organopolysiloxanes with an average particle size of up to 150 nanometer (0.15 micrometer μm). All of the Examples however show compositions having an average particle size of less than 100 nanometer (0.1 micrometer μm), and the microemulsions are characterized as having a transparent appearance. In addition, the process requires a first step of emulsifying silane and cyclic siloxane monomers using high shear homogenizers, before dripping the resulting crude emulsion into an aqueous catalyst solution for polymerization.

Thus, methods known in the art that use emulsion polymerization as the process for making siloxane resin emulsions are limited as the resulting emulsions generally do not have a broad range of possible average particle sizes. In particular, these methods cannot produce macro-emulsions in which the particle size is typically greater than 150 nanometer (0.15 micrometer μm). Macro-emulsions have several advantages among which are that they are (i) capable of providing enhanced deposition properties; (ii) less surfactant is required in their preparation with the result that such emulsions cost less to make; and (iii) less surfactant in the macro-emulsions leads to less adverse effects in certain applications, for example, less skin irritation for body contact in personal care applications, and less plasticizing effect in coating applications.

The present inventors have discovered a process for making certain polyorganosiloxane resin emulsions using emulsion polymerization techniques. The process produces polyorganosiloxane resin emulsions having a wide range of average particle sizes. The emulsions have a mono-modal particle size distribution, and this is achieved by control of the reaction operating parameters. The polyorganosiloxane resin emulsions can be characterized by the absence of coarse gelled particles, and this has been confirmed by the fact that the resin produced is soluble in at least one organic solvent. The process also produces stable polyorganosiloxane resin emulsions with a solid content of the resin greater than 10 percent based on the total weight of the emulsion. It is not necessary to mechanically emulsifying the precursor monomer prior to its addition to the reaction medium. Polyorganosiloxane resin emulsions made by the emulsion polymerization process of the invention have an average particle size of 100-1,000 nanometer (0.1-1 micrometer μm).

This invention provides a process for making aqueous siloxane resin containing emulsions by:
(i) adding water, at least one nonionic surfactant, optionally adding an ionic surfactant, and a catalyst, to a reaction vessel, and heating the contents of the vessel to form a mixture;
(ii) adding to the mixture at least one silane monomer of the formula $RSi(OR')_3$;
(iii) optionally, adding to the mixture, silane monomers of the formula $R_2Si(OR')_2$ or $R_3SiOR'$;
(iv) allowing the silane monomer to hydrolyze and condense by a polymerization reaction in the catalyzed aqueous mixture;
(v) terminating the reaction by neutralizing the mixture; and
(vi) recovering from the mixture a siloxane resin emulsion containing a siloxane resin.

These and other features of the invention will become apparent from a consideration of the detailed description.

The invention herein relates to a process of making siloxane resin emulsions by emulsion polymerization in which the average size of the resin particles in the emulsion is about 20-1,000 nanometer (0.02-1 micrometer μm). Preferably, the average size of the resin particles in the emulsion is greater than 100 to 1,000 nanometer (0.1-1 micrometer μm). Most preferably, the average size of the resin particles in the emulsion is 150 to 1,000 nanometer (0.15-1 micrometer μm). The resin composition consists of 30-100 mol percent trifunctional siloxane T units $RSiO_{3/2}$, 0-70 mol percent difunctional D units $R_2SiO_{2/2}$, and 0-40 mol percent monofunctional M units $R_3SiO_{1/2}$, where R represents a monovalent hydrocarbon group or an organofunctional substituted hydrocarbon group.

The process herein differs from the '541 patent in that it uses a silane monomer or a hydrolysis product thereof as the precursor monomer, and produces emulsions containing resinous siloxanes; whereas the precursor monomer in the '541 patent is a cyclic siloxane, and the process produces emulsions containing linear siloxanes. The preferred silane monomers are alkoxysilanes, although organosilanols can also be used as silane monomers.

The process involves first mixing water, one or more surfactants, and a catalyst, in a reaction vessel and heating the mixture to the reaction temperature. This is followed by the step of feeding the monomer to the heated mixture over a period of time. In this regard, it D should be noted that an alkoxysilane precursor monomer hydrolyzes in the catalyzed aqueous medium, and the resulting silanol composition condenses and precipitates to form the polymer particles, which in turn are stabilized in the resulting emulsion by the surfactant(s). The polymer molecular weight increases as a function of the reaction time. Once the desired molecular weight has been attained, the reaction is terminated by neutralizing the aqueous medium. Dilutional water can be optionally added to achieve the desired content of resin solids. Additional surfactant(s) can also be optionally added to provide dilutional and/or freeze-thaw stability. Any alcohols formed by hydrolysis of the alkoxysilane, can be removed by either simultaneous distillation during polymerization, or post stripping of the emulsion after the emulsion has been produced.

The precursor monomer used in the process of the invention consists of (i) silane monomers of the formula $RSi(OR')_3$ which provide the T unit in the resin; (ii) silane monomers of the formula $R_2Si(OR')_2$ which provide D units; and (iii) silane monomers of the formula $R_3SiOR'$ which provide M units for endblocking the resin polymer that is formed. In the formulas, R can be the same or a different monovalent hydrocarbon group having 1-18 carbon atoms, or R can be the same or a different organofunctional substituted hydrocarbon group having 1-18 carbon atoms. R' represents the hydrogen atom, an alkyl radical containing 1-4 carbon atoms, or one of the groups $CH_3C(O)—$, $CH_3CH_2C(O)—$, $HOCH_2CH_2—$, $CH_3OCH_2CH_2—$, or $C_2H_5OCH_2CH_2—$.

Some examples representative of suitable R groups include methyl, propyl, isobutyl, octyl, phenyl, vinyl, 3-glycidoxypropyl, aminoethylaminopropyl, 3-methacryloxypropyl, 3-chloropropyl, 3-mercaptopropyl, 3,3,3-trifluoropropyl, and perfluorobutylethyl.

It should be understood that when any substituent in the R group is present that reacts with water under the reaction conditions, it would not be present as such in the final product. Preferred R' groups are hydrogen, methyl and ethyl. If desired, a short chain trimethylsiloxy terminated polysiloxane such as hexamethyldisiloxane, or a primary alcohol such as 1-octanol, can be used in place of the silane monomer $R_3SiOR'$ unit as the endblocking component. In addition, polycyclosiloxanes such as octamethylcyclotetrasiloxane ($D_4$) can be used, if desired, to replace the $R_2Si(OR')_2$ unit to provide D units.

Resin copolymers can be produced by using more than one type of monomer, by either sequentially adding an appropriate amount of each monomer, or by the addition of a mixture of different monomers to the catalyzed aqueous surfactant mixture. Silane partial hydrolysis-condensation products can also be used as a starting material, provided that their solubility in the aqueous medium is not unduly decreased. Levels of the total amount of monomer useful in the emulsion polymerization process of the invention are 10-50 percent by weight, based on the combined weight of the water, the surfactant, the catalyst, and the monomer(s). The most preferred level is dependent on the nature of the monomer and the particle size being targeted. Monomer levels at the high end of the range are achievable with simultaneous removal of the alcohol formed from hydrolysis of alkoxysilanes. Monomer levels less than 10 percent by weight are possible, but result in a final emulsion with a low solid content, and therefore may not be economical or cost effective. Most typically, the levels of the monomer(s) should be within the range of 20-40 percent by weight.

It is necessary to sufficiently mix the water, the surfactant, and catalyst, prior to addition of the monomer. It is also necessary to constantly maintain agitation both during and following feeding of the monomer(s), until a stable emulsion is formed. High speed shearing is not required however. Emulsification of monomer prior to its feed is also not necessary. The rate of addition of the monomer should be at a rate less than 20 moles per liter of water per hour, preferably less than 10 moles per liter of water per hour, based on the amount of water in the mixture. The exact rate of addition will depend on the type of monomer being used, the level of catalyst present, and the reaction temperature.

The temperature of the aqueous mixture containing the surfactant and the catalyst should be stabilized, and it should remain constant during and following feeding of the monomers until all of the monomers are consumed. Temperature fluctuations will tend to cause a broadening of the particle size distribution, which is undesirable. Polymerization reaction temperatures useful according to the process of the invention are typically above the freezing point of water, but below the boiling point of water, under the operating pressure, which is normally at atmospheric pressure. Generally, the polymerization process will proceed faster at higher temperatures. The preferred temperature range is 30-95° C.

The polymerization reaction is carried out in an aqueous medium containing the surfactant, and it is catalyzed by a siloxane condensation catalyst. Condensation polymerization catalysts which can be used include (i) strong acids, such as substituted benzenesulfonic acids, aliphatic sulfonic acids, hydrochloric acid, and sulfuric acid; and (ii) strong bases such as quaternary ammonium hydroxides, and alkali metal hydroxides. Some ionic surfactants, such as dodecylbenzenesulfonic acid, can additionally function as a catalyst.

Typically, an acid catalyst is used to catalyze polymerization in an anionic stabilized emulsion; whereas and a basic catalyst is used to catalyze polymerization in a cationic stabilized emulsion. For nonionically stabilized emulsions, polymerization can be catalyzed by using either an acid catalyst or a basic catalyst. The amount of the catalyst present in the aqueous reaction medium should be at levels of $1 \times 10^{-3}$ to 1 molarity (M). In some cases, an amine containing silane monomers such as aminoethylaminopropyltrimethoxysilane can be used as one component of the monomer mixture, and the amine functionality will catalyze the reaction without the need for an additional catalyst.

Reaction times are generally less than 24 hours, and most typically less than 5 hours from the start of the monomer feed to the aqueous mixture. When the resin polymer reaches the desired molecular weight, it is preferred to terminate the reaction by neutralizing the catalyst, using an equal or slightly greater stoichiometric amount of an acid or a base, for base catalyzed and acid catalyzed systems, respectively. When an amine functional silane monomer is used without the presence of another catalyst, an acid can be used to neutralize the reaction. Some appropriate acids that can be used to neutralize the reaction include strong or weak acids, such as hydrochloric acid, sulfuric acid, or acetic acid. Some appropriate bases that can be used to neutralize the reaction include strong or weak bases, such as quaternary ammonium hydroxides, alkali metal hydroxides, triethanolamine, or sodium carbonate. It is preferred to neutralize the reaction medium with a sufficient quantity of the acid or the base, such that the resulting resin containing emulsion has a pH equal to, or slightly less than 7, when a cationic surfactant is present, and a pH equal to, or slightly greater than 7, when an anionic surfactant is present.

One or more surfactants are necessary in the reaction medium to stabilize the polysiloxane resin that is formed in the emulsion. An anionic surfactant, cationic surfactant, or a nonionic surfactant can be used alone, or in combination, except for combining anionic surfactants and cationic surfactants. Stable microemulsions can be prepared using only ionic surfactants. The use of a nonionic surfactant during polymerization is desirable to (i) make white resin emulsions having an average particle size of the resin in the emulsion greater than 100 nanometer (0.1 micrometer μm), without formation of coarse gelled agglomerates; and ii) to provide control of the particle size. Nonionic surfactants can be used alone, or in combination with another cationic surfactant or anionic surfactant. In addition, if desired, two or more nonionic surfactants can be used in preparing the emulsion.

Some suitable anionic surfactants which can be used include (i) sulfonic acids and their salts, including alkyl, alkylaryl, alkylnapthalene, and alkyldiphenylether sulfonic acids, and their salts, having at least 6 carbon atoms in the alkyl substituent, such as dodecylbenzensulfonic acid, and its sodium salt or its amine salt; (ii) alkyl sulfates having at least 6 carbon atoms in the alkyl substituent, such as sodium lauryl sulfate; (iii) the sulfate esters of polyoxyethylene monoalkyl ethers; (iv) long chain carboxylic acid surfactants and their salts, such as lauric acid, steric acid, oleic acid, and their alkali metal and amine salts.

It should be noted that certain anionic surfactants such as dodecylbenzene sulfonic acid, are capable of functioning both as a surfactant and a catalyst; in which case, the need for an additional acid catalyst, may or may not be needed. The use of a combination of an anionic surfactant and a strong acid catalyst such as sulfuric acid is also a viable option. Anionic surfactants that are commercially available include dodecylbenzenesulfonic acid sold under the names Bio-Soft S-100 or Bio-Soft S-101, and its triethanolamine salt sold under the name Bio-Soft N-300 by the Stepan Company, Northfield, Ill.

Some suitable cationic surfactants which can be used include (i) fatty acid amines and amides and their salts and derivatives, such as aliphatic fatty amines and their derivatives; and (ii) quaternary ammonium compounds such as alkyl trimethylammonium and dialkyldimethylammonium halides, or acetates, or hydroxides, having at least 8 carbon atoms in each alkyl substitutent. Cationic surfactants that are commercially available include compositions sold under the names Arquad T27 W, Arquad 16-29, by Akzo Nobel Chemicals Inc., Chicago, Ill.; and Ammonyx Cetac-30 by the Stepan Company, Northfield, Ill.

The amount of anionic surfactant and cationic surfactant can be 0-50 percent by weight based on the weight of the polysiloxane resin to be formed. The exact amount will necessarily depend on the particular particle size of the resin in the emulsion being targeted. Typically, less than 20 percent by weight, based on the weight of the polysiloxane resin to be formed, of the active anionic surfactant or the cationic surfactant, can be used to produce emulsions containing resin particles having an average particle size greater than 100 nanometer (0.1 micrometer μm).

The nonionic surfactants preferred for use according to the invention have a hydrophilic-lipophilic balance (HLB) between 10-20. While nonionic surfactants with an HLB of less than 10 can be used, a hazy solution is likely to result, due to the limited solubility of the nonionic surfactant in water, with the result that an effective surfactant effect does not occur. It is preferred therefore, that when using a nonionic surfactant with an HLB of less than 10, that another nonionic surfactant with an HLB of greater than 10 be added, so that the combined HLB of the two surfactants is greater than 10.

Some suitable nonionic surfactants which can be used include polyoxyethylene alkyl ethers, polyoxyethylene alkyl phenyl ethers, polyoxyethylene fatty acid esters, sorbitan fatty acid esters, and polyoxyethylene sorbitan fatty acid esters. Nonionic surfactants which are commercially available include compositions such as (i) 2,6,8-trimethyl-4-nonyl polyoxyethylene ether sold under the names Tergitol TMN-6 and Tergitol TMN-10; (ii) the C11-15 secondary alkyl polyoxyethylene ethers sold under the names Tergitol 15-S-7, Tergitol 15-S-9, Tergitol 15-S-15, Tergitol 15-S-30, and Tergitol 15-S-40, by the Dow Chemical Company, Midland, Mich.; octylphenyl polyoxyethylene (40) ether sold under the name Triton X405 by the Dow Chemical Company, Midland, Mich.; (iii) nonylphenyl polyoxyethylene (10) ether sold under the name Makon 10 by the Stepan Company, Northfield, Ill.; (iv) ethoxylated alcohols sold under the name Trycol 5953 by Henkel Corp./Emery Group, Cincinnati, Ohio; and (v) ethoxylated alcohols sold under the name Brij 35 Liquid by Uniqema (ICI Surfactants), Wilmington, Del.

The nonionic surfactant may also be a silicone polyether (SPE). The silicone polyether may have a rake type structure wherein the polyoxyethylene or polyoxyethylene-polyoxypropylene copolymeric units are grafted onto the siloxane backbone, or the SPE can have an ABA block copolymeric structure wherein A represents the polyether portion and B the siloxane portion of an ABA structure.

Silicone polyethers suitable for use herein have the formula $MD_{0-100}D^{PE}_{1-100}M$, most preferably the formula $MD_{0-500}D^{PE}_{1-50}M$, where M represents the monofunctional unit $R_3SiO_{1/2}$, D represents the difunctional unit $R_2SiO_{2/2}$, and $D^{PE}$ represents the difunctional unit $RR^{EO}SiO_{2/2}$. In these formulas, R can be the same or a different monovalent hydrocarbon group having 1-18 carbon atoms, and $R^{PE}$ is an oxyalkylene (PE—denotes polyether) containing moiety. The RE groups may contain only oxyethylene (EO) units; a combination of oxyethylene (EO) and oxypropylene (PO) units; or a combination of oxyethylene (EO) units, oxypropylene (PO) units, and oxybutylene (BO) units. Preferred $R^{PE}$ groups include oxyalkylene units in the approximate ratio of $EO_{3-100}PO_{0-100}$, most preferably in the ratio $EO_{3-30}PO_{1-30}$.

$R^{PE}$ moieties typically includes a divalent radical such as $—C_mH_{2m}—$ where m is 2-8 for connecting the oxyalkylene portion of R' to the siloxane backbone. Such moieties also contain a terminating radical for the oxyalkylene portion of $R^{PE}$ such as hydrogen, hydroxyl, or an alkyl, aryl, alkoxy, or acetoxy group.

Silicone polyethers useful herein can also be of a type having the formula $M^{PE}D_{10-1,000}D^{PE}_{0-100}M^{PE}$, most preferably the formula $M^{PE}D_{10-500}D^{PE}_{0-50}M^{PE}$, wherein $M^{PE}$ represents the monofunctional unit $R_2R^{PE}SiO_{1/2}$, D represents the difunctional unit $R_2SiO_{2/2}$, and $D^{PE}$ represents the difunctional unit $RR^{PE}SiO_{2/2}$. In these formulas, R and $R^{PE}$ are the same as above.

In addition, silicone polyethers useful herein can be of a type having the formula $MD_{0-1,000}D^{PE}_{0-100}D''_{1-100}M$ wherein D'' represents the difunctional unit $R''SiO_{2/2}$, and R'' is an alkyl group containing 1-40 carbon atoms. If desired, R'' can also be an aryl group such as phenyl; an arylalkyl group such as benzyl; an alkaryl group such as tolyl; or R'' can represent a substituted alkyl group such as aminoalkyl, epoxyalkyl, or carboxyalkyl. M, D, D'', and R, are the same as defined above.

Representative silicone polyethers according to such formulas are listed below. These compositions are also referred to in the accompanying Examples. The HLB (hydrophile-lipophile balance) of each silicone polyether is a value obtained by dividing the molecular weight percent of the ethylene oxide portion of each molecule by five.

| Silicone Polyether | Nominal Structure of the Silicone Polyether | HLB |
|---|---|---|
| A | $M^{PE}D_{13}M^{PE}$ where R is $—CH_3$ and $R^{PE}$ is $—(CH_2)_3(EO)_{12}OH$ | 9.2 |
| B | $MD_{108}D^{PE}_{10}M$ where R is $—CH_3$ and $R^{PE}$ is $—(CH_2)_3(EO)_{18}(PO)_{18}OAc$ | 6.6 |
| C | $MD_{8.6}D^{PE}_{3.6}M$ where R is $—CH_3$ and $R^{PE}$ is $—(CH_2)_3(EO)_{12}OH$ | 12.3 |

The amount of nonionic surfactant used according to the invention is 1-50 percent by weight based on the weight of the polysiloxane resin formed. The exact amount of nonionic surfactant will depend on the particular size of the resin particles in the emulsion being targeted. For emulsions having an average particle size of the resin in the emulsion of greater than 100 nanometer (0.1 micrometer μm), the amount of the nonionic surfactant should be 3-25 percent by weight of the active surfactant, based on the weight of the polysiloxane resin formed.

A wide range of targeted particle size can be achieved by controlling or specifying certain operating parameters for processes of making polysiloxane resin emulsions of the invention by emulsion polymerization. The operating parameters affecting or controlling the average particle size for a fixed or certain monomer or monomer mixture include (i) the reaction temperature; (ii) the amount and the type of anionic or cationic surfactant; (iii) the amount and type of nonionic surfactant; (iv) the amount of water; (v) the amount of catalyst; and (vi) the feeding rate of the precursor monomer.

The effect of each of these operating parameters may also depend upon the values of the other parameters. For example, it is possible to simultaneously change two operating parameters and negate the effect of each, resulting in no change in particle size. While it is not possible to give the exact value or limit of one particular operating parameter for obtaining a specific particle size, such values or limits for targeted particle size ranges can be determined, based on other reaction conditions and compositions.

The type of precursor monomer, and especially its functionality, also plays a part in determining particle sizes achievable through reactivity, geometric constraint, and catalytic effect. The amount of alcohol formed from hydrolysis of alkoxysilanes, and therefore present during polymerization, also has an impact on the emulsion particle size, due to the change in solvency and hence in the change in surfactant efficiency of the emulsifier.

The presence of a nonionic surfactant during polymerization is desirable for the control of particle size in emulsions according to the invention. Absent the nonionic surfactant during emulsion polymerization, generally, only transparent microemulsions with low solid content can be produced. A small particle size limits the upper level of solid content due to the small volume-to-surface area ratio, Any attempts to increase the particle size beyond about 100 nanometer (0.1 micrometer μm) in the absence of a nonionic surfactant by only adjusting the other operating parameters, generally results in the formation of large amounts of coarse particulate lumps.

Dilutional water, additional amounts of a surfactant, and temperature change, after neutralization, do not affect particle size, although theses features may affect the overall stability of the emulsion.

Emulsions prepared by the process of the invention contain particles having a mono-modal particle size distribution. The particle size distribution is narrow. When measured by light scattering particle size instruments, the particle size dispersity ($D_v/D_n$), defined as the ratio of volume average particle diameter ($D_v$) to the number average particle diameter ($D_n$), is typically 1.01-1.3.

The resin composition preferably consists of homopolymers or copolymers containing 30-100 mol percent of trifunctional T siloxane units $RSiO_{3/2}$, 0-70 mol percent of difunctional D units $R_2SiO_{2/2}$, and 0-40 mol percent of monofunctional M units $R3SiO_{1/2}$, where R is a monovalent hydrocarbon group having 1-18 carbon atoms, or a functionally substituted hydrocarbon group having 1-18 carbon atoms.

Emulsions prepared according to the invention have been found to be stable on standing for months to even years. In some instances, when sedimentation did occur, it was due to the significant density difference between the resin particles and the aqueous phase, however the emulsion was re-dispersible by means of simple agitation. The resin made by the process according to the invention has also been found to remain stable for months to even years.

The resin emulsions herein can be used as prepared, diluted with water, or used as an additive in formulations for treating the surfaces of materials to impart various properties such as water repellency, stain resistance, mold release, non-slipperiness, shine, and protection. Thus, the resin emulsions have utility as treating agents for fabric, paper, leather, metal, ceramics including glass, plastics, and building materials. They can be used in personal care applications, textile treatment, household care, auto care, and as coatings. In addition, the resin emulsions can be used as a binder, filler, an additive for modifying thermoplastic polymers, or for modifying the impact resistance of materials.

EXAMPLES

The following examples are set forth in order to illustrate the invention in more detail. All parts are by weight, unless otherwise specified. A NiComp™ 370 Particle Sizer from Pacific Scientific Instruments, Grants Pass, Ore., was used to measure particle size in Examples 1-4, 11-19, and Comparison Examples 1 and 2. Nicomp™ 370 Particle Sizers do not enable the calculation of particle size dispersity ($D_v/D_n$). A Microtrac Nanotrac 150 Particle Analyzer from Microtrac, Inc., North Largo, Fla., in the volume mode, was used to measure particle size in Examples 5-10 and 20-22. Resin molecular weight was measured using Gel Permeation Chromatography after coagulating the resin polymer from the emulsion, unless otherwise specified.

Examples 1-10

Anionic Propyl (Pr) T Resin Emulsions

Anionic propyl T resin emulsions having an average particle size in the range of 50-500 nanometer (0.05-0.5 micrometer μm) were prepared using the following procedure. The average particle size, amounts of ingredients, and silane monomer feed rate are shown in Table 1. All batch sizes were 350 gram for all of the ingredients being combined. To a 500 milliliter three-neck round bottom flask was added, the initial amount of water, Brij 35L nonionic surfactant as a solution containing 72 percent by weight of the active surfactant in water, and dodecylbenzenesulfonic acid (DBSA). The flask was fitted with a glass rod with a Teflon® paddle stirrer, a reflux condenser, a Dean Starke trap for collecting alcohol (methanol), a heating mantle, and a thermocouple attached to a temperature controller. The contents of the flask were stirred at 200 RPM while heating to 90° C. The flask and the alcohol path were covered with an insulation mat or foil to aid in the distillation of alcohol. When the temperature had stabilized at 90° C., propyltrimethoxysilane (Examples 1-9) and propyltriethoxysilane (Example 10) were fed to the flask over a period of time at a constant rate. During the silane monomer feed, the alcohol was collected and drained from the trap. While the alcohol was being distilled, the temperature dropped by 1-2° C.

After feeding the silane monomer, the reaction was allowed to continue for about another hour until the temperature had increased to 90° C. or the alcohol collection had slowed propyltrimethoxysilane down. Some or all of the alcohol produced from the hydrolysis of the silane monomer was removed as an alcohol/water mixture. The reaction mixture was neutralized with an aqueous solution of triethanolamine (TEA). The contents of the flask were cooled to room temperature while dilutional water was added. The resulting resin emulsions were milky white with a mono-modal particle size distribution. The final emulsions contained about 20-23 percent $PrSiO_{3/2}$ liquid resins. The emulsions left none or only trace amounts of deposition on the flask, and showed no sedimentation or creaming after being subjected to centrifugation at 3,000 RPM for 30 minutes. The emulsions showed no signs of phase separation or flocculation after two years of storage under ambient conditions.

On aging the emulsions for one month at 50° C., the average particle size showed no significant change in its distribution, and the average particle size remained generally within about 10 percent of the average particle size of the fresh emulsions. The resins in the emulsions were also generally stable over time. The weight average molecular weight of the resins, after the emulsions were heat aged, drifted less than 20 percent, generally less than about 10 percent, as compared to the weight average molecular weight of the fresh emulsions.

Examples 11-20

Cationic Propyl T Resin Emulsions

Cationic propyl T resin emulsions having an average particle size in the range of 50-500 nanometer (0.05-0.5 micrometer μm) were prepared according to the following procedure. The average particle size, amounts of the ingredients, silane monomer feed rate, and reaction temperatures, are shown in Table 2. All batch sizes were about 350 gram for all of the ingredients combined. To a 500 milliliter three-neck round-bottomed flask were added, the initial water, Trycol 5953 nonionic surfactant as a solution of 90 percent by weight of the active surfactant in water, Arquad T27 W cationic surfactant as a solution containing 27 percent by weight of the active surfactant in water, and an aqueous solution containing 50 percent by weight of sodium hydroxide. The flask was fitted with a glass rod having a Teflon® paddle stirrer, a reflux condenser, a Dean Starke trap for collection of alcohol, a heating mantle, and a thermocouple attached to a temperature controller. The flask contents were stirred at 200 RPM while being heated to an elevated temperature. The flask and the alcohol path were covered with insulation mat or foil to aid in the distillation of alcohol. When the temperature had stabilized, propyltrimethoxysilane was fed into the flask over a period of time. During the silane monomer feed, alcohol was collected and drained from the trap. While the alcohol was being distilled, the temperature dropped by 1-2° C.

After the silane monomer feed, the reaction was allowed to continue for 1-1.5 hours until the temperature had increased or the rate of alcohol collection slowed down. Some or all of the alcohol produced from the hydrolysis of the silane monomer was removed as an alcohol/water mixture. The reaction was neutralized with an aqueous solution containing 10 percent by weight of acetic acid. The flask contents were cooled to room temperature while dilutional water was being added. The resulting emulsions were milky white with mono-modal particle size distributions. The final emulsions contained about 20-23 percent $PrSiO_{3/2}$ solid resins. The emulsions exhibited no signs of phase separation after two years storage under ambient conditions.

Examples 21 and 22

Cationic Phenyl (Ph) T Resin Emulsions

Cationic phenyl T resin emulsions having an average particle size in the range of 100-1,000 nanometer (0.1-1 micrometer µm) were prepared according to Examples 11-20 except that (i) phenyltrimethoxysilane was used as the monomer instead of propyltrimethoxysilane; (ii) Tergitol TMN-6 as a solution containing 90 percent by weight of the active surfactant in water, combined with Tergitol 15-S-40 as a solution containing 70 percent by weight of the active surfactant in water, were used as the nonionic surfactant(s) instead of Trycol 5953; and (iii) and Arquad 16-29W as a solution containing 29 percent by weight of the active surfactant in water was used as the cationic surfactant instead of Arquad T27 W. The average particle size, the amounts of ingredients used in the procedure, the silane monomer feed rate, and the reaction temperature, are shown in Table 3. Both batch sizes were about 350 gram for all of the ingredients combined. The reaction was stirred at 250 RPM. In Example 22, the initial nonionic surfactants were added after the monomer feed was completed as opposed to being added initially.

In both examples, additional nonionic surfactant and water were added after neutralization. Both Examples 21 and 22 produced milky white emulsions with mono-modal particle size distribution, and each emulsion contained approximately 23 percent of $PhSiO_{3/2}$ solid resins. The emulsion in Example 21 sedimented over time while standing due to the large particle size and the relatively large difference in density between the phenyl resin and water. However, the emulsion was re-dispersible upon shaking. The particle size and the resin molecular weight showed no significant change when measured after the emulsion had been stored for two years in ambient condition. The emulsion in Example 22 had only a trace amount of sedimentation after two years of storage at ambient temperature.

Example 23

Cationic Phenyl-Propyl T Copolymer Resin Emulsion

Cationic $T^{Ph}T^{Pr}$ copolymer resin emulsions were prepared according to the following procedure. To a 500 milliliter three-neck round bottomed flask, was added 137.7 gram (38.5 parts) of water, 4.75 gram (1.33 parts) of Tergitol TMN-6 nonionic surfactant as a solution containing 90 percent by weight of the active surfactant in water, 8.62 gram (2.41 parts) of Arquad 16-29W cationic surfactant as a solution containing 29 percent by weight of the active surfactant in water, and 0.83 gram (0.23 parts) of sodium hydroxide as a 10 percent by weight aqueous solution. The flask was fitted with a glass rod with a Teflon® paddle stirrer, a reflux condenser, a heating mantle, and a thermocouple attached to a temperature controller. The contents of the flask were stirred at 250 RPM while heating to 50° C. When the temperature had stabilized at 50° C., a mixture consisting of 77.66 gram (21.7 parts) of phenyltrimethoxysilane, 26.0 gram (7.26 parts) of propyltrimethoxysilane, and 4.38 gram (1.22 parts) of endblocking component hexamethyldisiloxane, was fed into the flask to the surfactant containing basic aqueous solution over 150 minutes.

After the silane monomer and siloxane feed was completed, the reaction mixture was allowed to continue for an additional 10 minutes, and then was neutralized with 1.23 gram (0.34 parts) of an aqueous solution containing 10 percent by weight of acetic acid. The contents of the flask were cooled to room temperature, while adding an additional 93.0 gram (26.0 parts) of water and 3.50 gram (0.98 parts) of Tergitol 15-S-40 nonionic surfactant as an aqueous solution containing 70 percent by weight of the active surfactant in water. Alcohol was produced but was not distilled, and remained in the final product. The resulting emulsion was bluish milky white, it had a mono-modal particle size distribution as measured with a Microtrac Nanotrac 150 Particle Analyzer, and the median diameter of the resin particles was 69 nanometer (0.069 micrometer µm). The particle size dispersity ($D_v/D_n$) was 1.18. The emulsion contained approximately 20 percent by weight of a trimethylsiloxy end capped phenyl-propyl silsesquioxane copolymeric solid resin. A sample of the emulsion was subjected to heat aging at 50° C. for 2 months in a closed but non-air-tight vial. The sample maintained its original appearance except for some thickening as a result of water evaporation. Both the particle size and the resin molecular weight remained substantially unchanged.

Examples 24-26

Cationic 1,2-Diol Functional Methyl DT Copolymer Resin Emulsions

Example 23 was repeated except that the monomers consisted of a mixture of methyltrimethoxysilane, 3-glycidoxypropyltrimethoxysilane, dimethyldimethoxysilane, and the product was an epoxy/diol functional methyl DT copolymer resin emulsions, containing resin particles having an average particle size in the range of 20 to 100 nanometer (0.02-0.1 micrometer µm). The emulsions were bluish white with mono-modal particle size distributions. Table 4 contains the amounts of the ingredients that were used, the reaction conditions, and the average particle size.

Example 27

Nonionic Methyl T Resin Emulsion

A methyl T resin emulsion was prepared using nonionic surfactants according to the following procedure. Added to a 500 milliliter three-neck round bottomed flask, was 208 gram (59.5 parts) of water, 5.61 gram (1.6 parts) of Tergitol TMN-6 nonionic surfactant as an aqueous solution containing 90 percent by weight of the active surfactant in water, 17.7 gram (5.0 parts) of Tergitol 15-S-40 nonionic surfactant as a solution containing 70 percent by weight of the active surfactant in water, and 3.50 gram (1.0 parts) of an aqueous solution containing 10 percent by weight of sodium hydroxide. The flask was fitted with a glass rod with Teflon® paddle stirrer, a reflux condenser, a Dean Starke trap for the collection of alcohol, a heating mantle, and a thermocouple attached to a temperature controller. The contents of the flask were stirred at 250 RPM while heating to 90° C. The flask and the alcohol path were covered with insulation mat to aid in distilling alcohol.

When the temperature had stabilized at 90° C., 109.7 gram (31.4 parts) of methyltrimethoxysilane was fed into the flask over 95 minutes. During the silane monomer feed, alcohol was generated, collected, and drained from the trap. While alcohol was being distilled, the temperature dropped by 1-2° C. After the silane monomer feed was completed, the reaction was allowed to continue for another 85 minutes, during which time the temperature returned to 90° C. A total of 111 gram alcohol/water mixture was removed. The reaction was neutralized with 5.25 gram (1.5 parts) of an aqueous solution containing 10 percent by weight of acetic acid. The reaction was then cooled to room temperature. The resulting resin emulsion was milky white, and had a mono-modal particle size distribution. The resin particles in the emulsion had a mean diameter of 85 nanometer (0.085 micrometer µm). The emulsion contained about 23 percent by weight of a MeSiO$_{3/2}$ solid resin.

Example 28

Emulsion Polymerization to Make a Silicone Resin Emulsion Incorporating a Silicone Polyether at the Start of the Process A silicone-in-water emulsion containing as the silicone, a liquid propyl silsesquioxane, was prepared by emulsion polymerization. According to the procedure, there was added to a 500 mL round bottom flask, 232.61 gram of deionized water, 3.81 gram of dodecylbenzenesulfonic acid, and 6.0 gram of Silicone Polyether C. The flask contents were stirred at 250 RPM while being heated at 90° C. After the surfactant had dispersed, 105 gram of propyltriethoxysilane monomer was fed to the mixture over a 90 minutes interval and at a constant rate. A white emulsion gradually formed. The reaction was maintained at 90° C. and agitated at 250 RPM for a period of time of 2.5 hours measured from initiation of the monomer feed. The reaction mixture was neutralized using 3.13 gram of triethanolamine solution with an active content of 85 percent in water. The content was cooled to room temperature. The final emulsion, hereafter referred to as emulsion VI, contained approximately 19% ethanol, based on the total weight of the emulsion, which was generated as a by-product from propyltriethoxysilane hydrolysis. Emulsion VI was milky white and had an average particle size of 344 nanometer and a mono-modal particle size distribution. The emulsion remained visibly the same for more than a month at ambient condition. A sample of the emulsion was centrifuged at 2000 RPM for 30 minutes and showed no sign of separation. Emulsion VI had excellent stability upon dilution with isopropyl alcohol as evidenced by the following. To 1 gram of emulsion VI was added 4 gram of isopropyl alcohol and mixed. The composition was centrifuged at 2000 RPM for 30 minutes and showed no sign of separation; it had a transparent appearance and remained stable for days.

Comparison Example 1

Anionic Propyl T Resin Emulsion Made without Nonionic Surfactant

Example 1 was repeated except that the Brij 35L nonionic surfactant was omitted, and the weight balance was compensated for by the addition of dilution water, as shown in Table 1. This procedure produced a thin and yellowish white emulsion, and it was noted that there was some buildup on the wall of the flask. The particle size had a tri-modal distribution with peaks at 11 nanometer (0.011 micrometer µm) (98.2 volume percent), 58 nanometer (0.058 micrometer µm) (1.6 volume percent), and 340 nanometer (0.34 micrometer µm) (0.2 volume percent).

Comparison Example 2

Cationic Propyl T Resin Emulsion Made without Nonionic Surfactant

Example 5 was repeated except that Trycol 5953 nonionic surfactant was omitted as shown in Table 2. This procedure produced an emulsion having a bi-modal distribution, with peaks at 58.7 nanometer (0.0587 micrometer µm) (94.2 volume percent), and 180.9 nanometer (0.1809 micrometer µm) (5.8 volume percent).

The foregoing data is tabulated below in Tables 1-4. In Table 1, it should be noted that in Example 10, propyltriethoxysilane was used instead of propyltrimethoxysilane. Also in Table 1, the concentration of TEA in Examples 6-10 was 85 percent, rather than 50 percent. In Table 2, it should be noted that in Example 20, the surfactants Tergitol TMN-6 and Ammonyx Cetac-30 were substituted for surfactants Trycol 5953 and Arquat T27W, respectively. The abbreviation NM is used in the Tables to show that values were not measured.

TABLE 1

Anionic Propyl T Resin Emulsions

Examples
Amounts in parts

| | Ex. 1 | Ex. 2 | Ex. 3 | Ex. 4 | Ex. 5 | Ex. 6 | Ex. 7 | Ex. 8 | Ex. 9 | Ex. 10 | Comparison Example 1 |
|---|---|---|---|---|---|---|---|---|---|---|---|
| Initial Water | 39.3 | 66.0 | 66.0 | 66.8 | 66.1 | 66.5 | 66.5 | 66.5 | 66.5 | 66.5 | 66.0 |
| Brij 35L | 1.7 | 1.7 | 1.1 | 0.87 | 1.7 | 1.7 | 1.7 | 1.7 | 1.7 | 1.7 | 0 |
| DBSA | 1.1 | 1.1 | 1.1 | 1.1 | 1.1 | 1.1 | 1.1 | 1.1 | 1.1 | 1.1 | 1.1 |
| Propyltrimethoxysilane | 30.1 | 30.1 | 30.1 | 30.1 | 30.1 | 30.1 | 30.1 | 30.1 | 30.1 | 30.2 | 30.1 |
| Feed Time | 90 min | 89 min | 92 min | 97 min | 45 min | 30 min | 60 min | 90 min | 120 min | 90 min | 83 min |
| TEA (50 percent) | 1.0 | 1.0 | 1.0 | 1.0 | 1.0 | 0.6 | 0.6 | 0.6 | 0.6 | 0.6 | 1.0 |
| Dilution Water | 26.8 | 0 | 0.63 | 0 | 0 | 0 | 0 | 0 | 0 | 0 | 1.7 |
| Average Particle Size Fresh Emulsion | 279 nm | 132 nm | 98 nm | 79 nm | 159 nm | 154 nm | 141 nm | 122 nm | 98.7 nm | 217 nm | Tri-modal |
| $D_v/D_n$ | NM | NM | NM | NM | 1.05 | 1.27 | 1.21 | 1.17 | 1.23 | 1.20 | NM |
| Average Particle Size Heat Aged Emulsion | NM | NM | NM | NM | NM | 160 nm | 123 nm | 121 nm | 134 nm | NM | NM |
| $D_v/D_n$ Heat Aged Emulsion | NM | NM | NM | NM | NM | 1.33 | 1.25 | 1.16 | 1.48 | NM | NM |
| Resin Molecular Weight (Mw/Mn) Fresh Emulsion | NM | NM | NM | NM | NM | 8,740/ 2,430 | 8,810/ 2,350 | 9,260/ 2,460 | 8,440/ 2,340 | NM | NM |
| Resin Molecular Weight (Mw/Mn) Heat Aged Emulsion | NM | NM | NM | NM | NM | 9,910/ 2,480 | 8,670/ 2,430 | 11,200/ 2,490 | 8,830/ 2,370 | NM | NM |

TABLE 2

Cationic Propyl T Resin Emulsions

Examples
Amounts in parts

| | Ex. 11 | Ex. 12 | Ex. 13 | Ex. 14 | Ex. 15 | Ex. 16 | Ex. 17 | Ex. 18 | Ex. 19 | Ex. 20 | Comparison Example 2 |
|---|---|---|---|---|---|---|---|---|---|---|---|
| Initial Water | 48.9 | 39.3 | 39.3 | 39.3 | 39.3 | 30.6 | 39.3 | 39.3 | 39.3 | 39.3 | 39.3 |
| Trycol 5953 | 1.2 | 0.94 | 1.2 | 1.5 | 1.2 | 1.2 | 1.2 | 1.2 | 1.2 | 1.36* | 0 |
| Arquad T27 W | 2.9 | 2.9 | 2.9 | 2.9 | 2.9 | 2.9 | 1.8 | 1.3 | 2.9 | 2.4* | 2.9 |
| NaOH (50%) | 0.17 | 0.17 | 0.17 | 0.17 | 0.17 | 0.17 | 0.17 | 0.17 | 0.17 | 0.18 | 0.17 |
| Propyltrimethoxysilane | 30.1 | 30.1 | 30.1 | 30.1 | 30.1 | 30.1 | 30.1 | 30.1 | 30.1 | 30.1 | 30.1 |
| Reaction Temperature | 90° C. | 90° C. | 90° C. | 90° C. | 85° C. | 90° C. | 90° C. | 90° C. | 95° C. | 90° C. | 90° C. |
| Feed Time | 45 min | 37 min | 43 min | 37 min | 50 min | 43 min | 39 min | 40 min | 39 min | 70 min | 39 min |
| HOAc (10%) | 1.4 | 1.4 | 1.4 | 1.4 | 1.4 | 1.4 | 1.4 | 1.4 | 1.4 | 1.4 | 1.4 |
| Average Particle Size | 88 nm | 100 nm | 119 nm | 124 nm | 124 nm | 148 nm | 170 nm | 216 nm | 353 nm | 101 nm | Bi-modal |
| $D_v/D_n$ | NM | NM | NM | NM | NM | NM | NM | NM | NM | 1.08 | NM |

TABLE 3

Cationic Phenyl T Resin Emulsions

Examples - Amounts in parts

| | Example 21 | Example 22 |
|---|---|---|
| Initial Water | 39.2 | 42.7 |
| Tergitol TMN-6 | 1.4 | 0 |
| Tergitol 15-S-40 (70 percent active) | 0.9 | 0 |
| Arquad 16-29W | 2.4 | 6.8 |
| NaOH (50 percent solution) | 0.09 | 0.10 |
| Phenyltrimethoxysilane | 29.9 | 30.1 |
| Feed Time | 120 min | 80 min |
| Tergitol TMN-6 | 0 | 0.24 |
| Tergitol 15-S-40 (70 percent active) | 0 | 1.37 |
| Reaction Temperature | 90° C. | 90° C. |
| Total Reaction Time | 150 min | 160 min |
| HOAc (10 percent solution) | 0.7 | 0.6 |
| Dilution Water | 24.9 | 17.0 |
| Additional Tergitol 15-S-40 (70%) | 0.5 | 1.0 |
| Median Particle Size (Fresh Emulsion) | 662 nm | 114 nm |
| $D_v/D_n$ (Fresh Emulsion) | 2.62 | 1.07 |
| Particle Size After 2 Years Storage | 703 nm | 98.3 nm |
| $D_v/D_n$ (2 Year Old Emulsion) | 1.19 | 1.22 |
| Resin Molecular Weight (Mw/Mn) | $5.25 \times 10^3$/ $2.13 \times 10^3$ | $4.78 \times 10^3$/ $1.81 \times 10^3$ |
| Resin MW After 2 Yrs Storage (Mw/Mn) | $5.36 \times 10^3$/ $2.02 \times 10^3$ | Not Measured |

TABLE 4

Cationic 1,2-Diol Functional Methyl DT Copolymer Resin Emulsions

| Examples - Amounts in parts | | | |
|---|---|---|---|
| | Example 24 | Example 25 | Example 26 |
| Initial Water | 48.2 | 48.3 | 48.3 |
| Tergitol TMN-6 | 1.90 | 1.89 | 1.89 |
| Arquad 16-29W | 2.41 | 2.40 | 2.41 |
| NaOH (10 percent solution) | 0.45 | 0.20 | 0.10 |
| Methyltrimethoxysilane | 22.0 | 22.0 | 22.0 |
| Glycidoxypropyltrimethoxysilane | 6.07 | 6.04 | 5.99 |
| Dimethyldimethoxysilane | 3.56 | 3.56 | 3.57 |
| Hexamethyldisiloxane | 2.01 | 2.01 | 2.00 |
| Feed Time | 140 min | 140 min | 150 min |
| Reaction Temperature | 50° C. | 50° C. | 50° C. |
| Total Reaction Time | 180 min | 150 min | 155 min |
| HOAc (10 percent solution) | 0.66 | 0.30 | 0.15 |
| Dilution Water (pts) | 11.7 | 12.3 | 12.6 |
| Additional Tergitol 15-S-40 (70%) | 1.00 | 1.00 | 1.00 |
| Median Particle Size | 47 nm | 64 nm | 70 nm |

Other variations may be made in compounds, compositions, and methods described herein without departing from the essential features of the invention. The embodiments of the invention specifically illustrated herein are exemplary only and not intended as limitations on their scope except as defined in the appended claims.

The invention claimed is:

1. A method of making an aqueous siloxane resin containing macro-emulsion comprising the steps of:
   (i) adding water, 1-50 percent by weight, based on the weight of the siloxane resin formed, of at least one nonionic surfactant, optionally adding an ionic surfactant, and a catalyst, to a reaction vessel, and heating the contents of the vessel to form a mixture;
   (ii) adding to the mixture at least one silane monomer of the formula $RSi(OR')_3$;
   (iii) optionally, adding to the mixture, silane monomers of the formula $R_2Si(OR')_2$ or $R_3SiOR'$,
wherein the silane monomer is added to the mixture and agitated under acidic or basic conditions, the rate of addition of the silane monomer being a rate less than 20 moles per liter of water per hour, based on the amount of water in the mixture, to effect hydrolysis and polycondensation;
   (iv) allowing the silane monomer to hydrolyze and condense by a polymerization reaction in the catalyzed aqueous mixture;
   (v) terminating the reaction by neutralizing the mixture; and
   (vi) recovering from the mixture a siloxane resin emulsion containing a siloxane resin comprising 30-100 mol percent of siloxane T units $RSiO_{3/2}$, 0-70 mol percent of siloxane D units $R_2SiO_{2/2}$, and 0-40 mol percent of siloxane M units $R_3SiO_{1/2}$,
wherein R is a monovalent hydrocarbon group having 1-18 carbon atoms or an organofunctionally substituted hydrocarbon group having 1-18 carbon atoms; and R' is hydrogen, an alkyl group containing 1-4 carbon atoms, or one of the groups $CH_3C(O)$—, $CH_3CH_2C(O)$—, $HOCH_2CH_2$—, $CH_3OCH_2CH_2$—, or $C_2H_5OCH_2CH_2$—; the siloxane resin emulsion containing siloxane resin particles having an average particle size of 150-1000 nanometers (0.15 to 1 micrometer μm), and the siloxane resin being soluble in at least one organic solvent.

2. A method according to claim 1 wherein the nonionic surfactant is a silicone polyether.

3. A method according to claim 1 where in step (iii), a primary alcohol or a short chain trimethylsiloxy terminated polysiloxane is substituted for the silanes of the formula $R_3SiOR'$; or a polycyclosiloxane is substituted for the silanes of the formula $R_2Si(OR')_2$.

* * * * *